Mar. 20, 1923.

A. J. KARL ET AL 1,449,328

POWER TRANSMISSION DEVICE

Filed Aug. 17, 1921  2 sheets-sheet 2

A.J.Karl & H.F.Webb,
INVENTORS

BY
Geo. P. Kimmel
ATTORNEY.

Patented Mar. 20, 1923.

1,449,328

UNITED STATES PATENT OFFICE.

ANDREW J. KARL AND BENJAMIN FRANKLIN WEBB, OF SISTERSVILLE, WEST VIRGINIA.

POWER-TRANSMISSION DEVICE.

Application filed August 17, 1921. Serial No. 493,034.

*To all whom it may concern:*

Be it known that we, ANDREW J. KARL and BENJAMIN FRANKLIN WEBB, citizens of the United States, residing at Sistersville, in the county of Tyler and State of West Virginia, have invented certain new and useful Improvements in Power - Transmission Devices, of which the following is a specification.

This invention relates to clutches and more particularly to an internal gear clutch mechanism which for its object to provide for the transmission of power from a main drive shaft to a driven or power member cooperating therewith.

The primary object of the invention is to provide for an internal gear construction capable of functioning efficiently for the transmission of power from a drive part to a driven part with a gradual increase of speed of the said driven part without sudden jerks or otherwise irregular motions thereof.

Another object of the invention is to provide a drive shaft having a tapered clutch member in the form of a toothed cone splined thereon meshing with a plurality of planet gears 13, said gears in turn being adapted to drive a power element enclosing the said cone and gears cooperating therewith.

A still further and important object of the invention is the provision of an internal gear clutch mechanism adapted and designed for use in various arts and particularly in automobile constructions, and one in which the parts are extremely simple in construction, easily assembled, rigid and durable, highly efficient in operation, practical and capable of being manufactured at a comparatively low cost whereby its commercial possibilities are greatly enhanced.

The invention will be best understood from a consideration of the following detailed description taken in connection with the accompanying drawings forming a part of this specification, with the understanding, however, that the invention is not confined to any strict conformity with the showing in the drawing, but may be changed and modified so long as such changes and modifications mark no material departure from the salient features of the invention as expressed in the appended claims.

We attain these objects and others in the accompanying drawings, wherein:—

Figure 1:
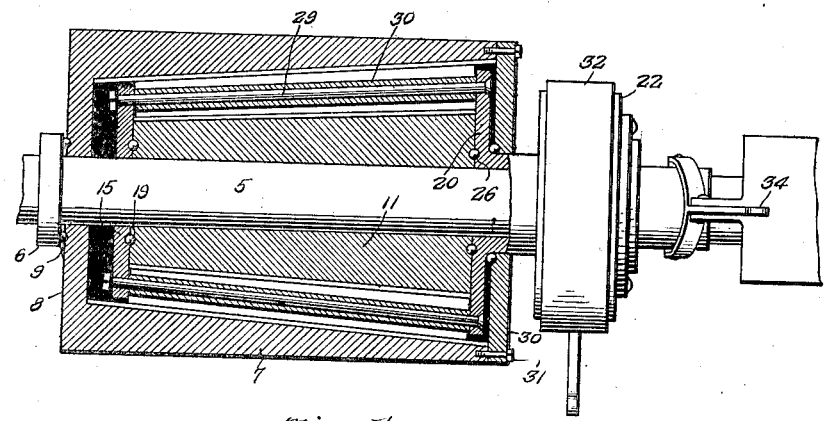
Figure 1 is a plan partly in section.
Figure 2:
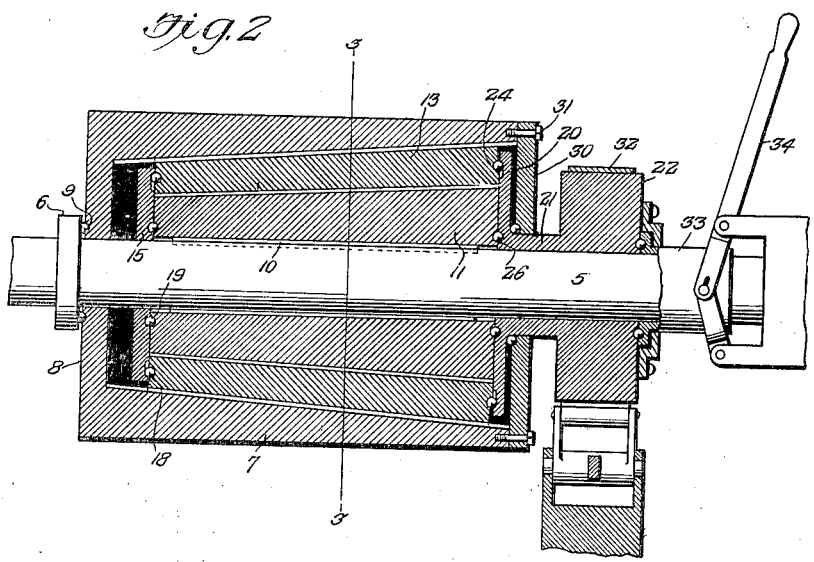
Figure 2 is a vertical longitudinal section therethrough.
Figure 3:
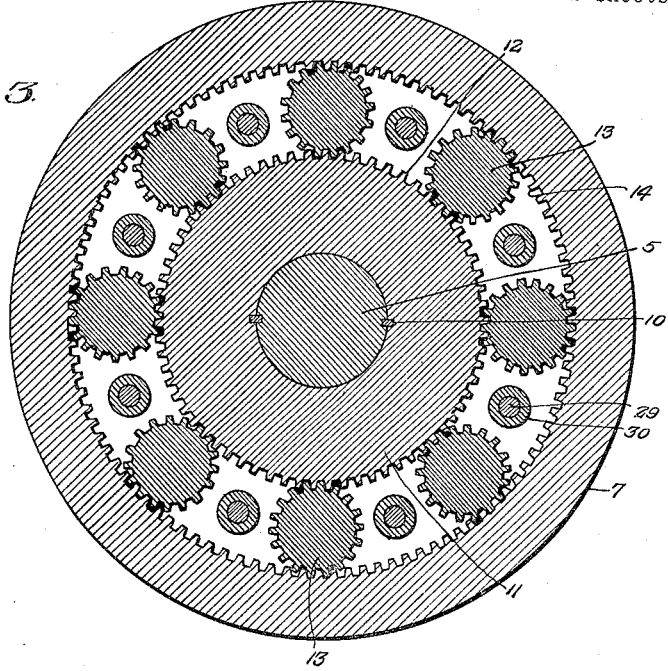
Figure 3 is a sectional view taken on the line 3—3 of Figure 2.
Figure 4:
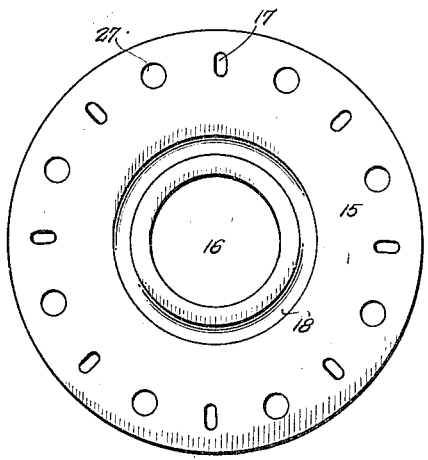
Figures 4 and 5 are enlarged perspective views of the end plates for the tapered cone gear and planet pinions.
Figure 5:
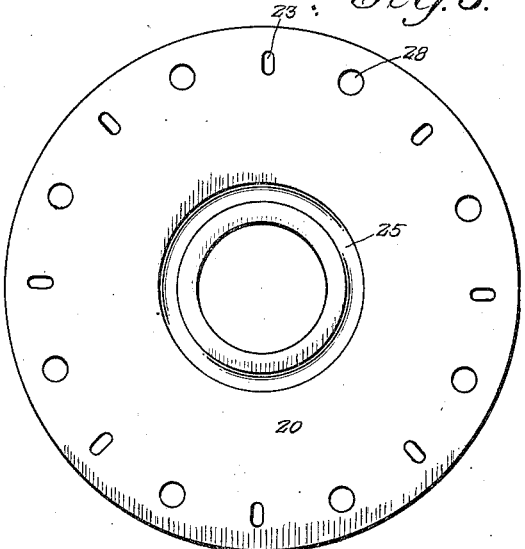

Referring now to the drawings wherein like numerals designate corresponding parts throughout the several views, 5 designates a power or driving shaft, termed a driving element, which may be driven from a motor for instance, the said shaft having a fixed or integrally formed collar 6 at one end thereof and a loosely mounted power transmitting element designated in its entirety by numeral 7 such as a hub, pulley or the like disposed at one side of the said collar 6. The power transmitting element above referred to is preferably cylindrical in form being provided with a tapered bore, the smaller end being closed by a wall 8, in the outer face of which is formed an annular race-way arranged in registry with a similar race-way formed in the opposed face of the collar 6 and provided with anti-friction members or ball bearings 9 as clearly disclosed by Figures 1 and 2 of the drawings. Splined on the power shaft 5 as shown at 10 and arranged thereon for sliding movement within the confines of the tapered bore of the power element 7 is a toothed clutch cone or member 11 or driving sun gear, which is correspondingly tapered with respect to the bore of the power element 7 and of a length somewhat less than the depth of said tapered bore. The clutch cone 11 above referred to is provided with teeth 12 on its outer periphery and meshing therewith are a plurality of equidistantly spaced and correspondingly tapered planets or tapered gears 13, which also mesh with internal gear teeth 14 formed in the wall of the tapered bore of the power element 7. Spaced from the smaller ends of the cone gear 11 and the planets 13, is a circular disk or plate 15, which is provided with a concentrically disposed opening 16, by means of which it is mounted on the shaft 5. This disk or plate 15 is also provided with a series of equidistantly spaced and radially elongated slots or recesses 17, corresponding in number to the number of planets 13, and are arranged to receive anti-friction ball bearings 18 interposed between the same and complementally formed circular recesses or depressions formed in the opposed ends of the planets 13. The plate 15 is further provided with an annular groove 18 for the reception of anti-friction devices or ball bearings 19 disposed between the same and the opposed end of the cone 11.

A similar enlarged plate 20 formed integral with the extension 21 of a brake drum or cylinder 22 is disposed adjacent the larger end of the tapered bore and in frictional engagement with the opposite ends of the planet gears 13 and the cone 11 as clearly shown by the drawings, The said plate 20 is also provided with a plurality of radially extending elongated slots 23 directly opposite to the slots 17 of the plate 15 which receive the ball bearings 24 in like manner. An annular groove 25 and ball bearings 26 therefor are provided for the proper operation of the said cone and the plate. Each of the plates 15, 20, are provided with opposed bolt holes 27, 28 respectively, between the radially extending elongated slots in the plates to receive the fastening bolts 29 and the collars 30 therefor connecting the respective plates and maintaining the same in proper position on the ends of the cone 11 and planet gears 13 within the tapered bore of the power element 7. The opposite end of the driven element 7 is provided with a closure plate 30 secured to the same by suitable fastening elements 31 thus preventing the admission of dirt or foreign matter to the lubricant between the gears.

The brake drum 22 above referred to is provided with the usual brake band 32 in the manner well understood and any suitable type of shifting mechanism 33 and operating lever 34 may be provided for actuating the mechanism for the proper operation thereof as above described. In the operation of the device for a direct drive, such drive is obtained by securely clutching the sun gear, the planet gears and the driven elements for unitary movement. When operated in the reverse direction, the brake band 32 prevents the rotation of the gear carrying cage and the gears 13 function as transmitting gears for imparting rotation from the cone 11 to the drive element 7 in a reverse direction to that of the shaft 10.

In the accompanying drawings, we have illustrated our invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described our invention what we now claim as new and desire to secure by Letters Patent of the United States, is:—

1. In a power transmission device a driving element, a driven element, a gear element keyed for sliding movement on said driving element, a plurality of tapered planets interposed between said gear element and said driven element and arranged to mesh therewith, a carrier for said planets, means for sliding said carrier relative to said driven element for moving said planets into and out of mesh therewith, and a braking means cooperative with said carrier to effect a reverse direction of operation of said planets and driven element.

2. In a power transmission device, a driving element, a driven element loosely mounted on said driving element and having a bore therein disposed concentrically of the same, a gear element slidably keyed on said driving element within the confines of the bore of said driven element, a plurality of tapered planets interposed between said gear element and said driven element and arranged to mesh therewith, means loosely mounted on said driving element for supporting said planets in position, means for actuating said first mentioned means for moving said planets into and out of mesh with said driven element, and a brake means operable for retaining said first mentioned means against movement relative to said gear element and said driven element whereby to cause the planets and the driven element to be rotated in a reverse direction.

3. In a power transmission device a driving element, a driven element loosely mounted on said driving element and having an inwardly tapering bore disposed concentrically thereof, a similarly tapered gear slidably keyed on said driving element within the bore of said driven element, planets, means loosely mounted on said driving element for supporting said planets in position and movable correspondingly with the operative movements of said tapered gear, and a braking means for retaining said first mentioned means against relative rotary movement with respect to said driving element and said driven element to cause the tapered gear to drive the planets and driven element.

4. In a power transmission device a driving element, a pulley, a cone-shaped gear slidably keyed on said driving element, a plurality of tapered planets interposed between said cone gear and said pulley, a cage loosely mounted on said driving element for supporting said planets in position, antifriction devices disposed between the walls of the cage and the ends of the opposed cone gear and said planets, a brake drum carried by said cage, and a brake band carried by said brake drum and operable to retain said cage against movements relative to said cone gear and said pulley to cause the cone gear to drive the planets and pulley in a reverse direction.

5. The combination with a driving part, a pulley loosely mounted on said driving part and having a bore surrounding said shaft and concentric thereto, a cone gear keyed on said part and disposed within the bore of said pulley, a plurality of planets interposed between said cone gear and the wall of the bore of said pulley and arranged to mesh therewith, means for moving said planets into and out of mesh with said pulley for the rotation on the same correspondingly with the direction of rotation of said driving part, and means for effecting a braking action on the parts whereby said planets are rotated by said cone gear in a direction reversed to that of the direction of rotation of said driving part and cone gear.

6. The combination with a driving part, of a pulley loosely mounted on said driving part and having a tapered bore extending therethrough and concentrically thereof, a cone gear slidably keyed on said part and disposed within the bore of said pulley, tapered planets extending between said cone gear and the opposed surface of the bore of said pulley and arranged to mesh therewith, a cage enclosing said cone gear and supporting said planets in position, means for manipulating said cage longitudinally within the bore of said pulley for moving said planets into and out of mesh with the latter, whereby to connect and disconnect the same to and from said cone gear, and means for effecting a braking action on said cage whereby said tapered planets and said pulley are driven in a direction reversed to the direction of rotation of said gear and said driving part.

In testimony whereof, we affix our signatures hereto.

ANDREW J. KARL.
BENJAMIN FRANKLIN WEBB.